Aug. 11, 1953 J. B. FULLERTON 2,648,343
OSCILLATABLE SPRAY MEANS FOR DISHWASHING APPARATUS
Filed May 29, 1947 5 Sheets-Sheet 2

INVENTOR.
James B. Fullerton
BY
ATTORNEY

Aug. 11, 1953 J. B. FULLERTON 2,648,343
OSCILLATABLE SPRAY MEANS FOR DISHWASHING APPARATUS
Filed May 29, 1947 5 Sheets-Sheet 3

INVENTOR.
James B. Fullerton
BY
ATTORNEY

Aug. 11, 1953   J. B. FULLERTON   2,648,343
OSCILLATABLE SPRAY MEANS FOR DISHWASHING APPARATUS
Filed May 29, 1947                              5 Sheets-Sheet 5

INVENTOR.
James B. Fullerton
BY
ATTORNEY

Patented Aug. 11, 1953

2,648,343

UNITED STATES PATENT OFFICE 2,648,343

OSCILLATABLE SPRAY MEANS FOR DISHWASHING APPARATUS

James B. Fullerton, Los Angeles, Calif., assignor to C. A. Miketta, Los Angeles, Calif.

Application May 29, 1947, Serial No. 751,431

20 Claims. (Cl. 134—138)

1

This invention relates generally to dish-washing apparatus and more particularly to dishwashing apparatus of the type wherein hot water or other cleansing fluid is sprayed or jetted upon the dishes while the dishes mounted in a basket are being rotated, incoming water furnishing power for rotation of the basket. Thus a continuous flow of hot water or other cleansing fluid takes place through the apparatus. The water then drains out the bottom of the apparatus.

Prior art dish-washing apparatus have numerous disadvantages. For example, they are generally of expensive, complicated construction and generally require a motor or the like to drive them. Furthermore, such prior art dish-washing apparatus have generally been of bulky construction, occupying a large floor space, and may not conveniently be removed from sight or stored in some otherwise unused space.

The dish washer of this invention is of simple, light, inexpensive construction, requiring no motor, and furthermore is adapted to be stored when not in use under a sink and out of sight, if so desired. Generally speaking, the dish washer of this invention comprises a bowl, a supporting rack rotatably mounted within the bowl, a perforate, dish-holding basket adapted to be carried by and rotated with the supporting rack, said supporting rack being provided with a reaction surface, and driving nozzle means adapted to direct a stream or jet of water under pressure against the reaction surface for rotating the supporting rack and the dish-holding basket thereupon. Upwardly directed dish-washing nozzles are positioned adjacent the bottom of the bowl and are adapted to emit powerfully upwardly directed streams of hot water. Oscillatable guide vanes are pivotally mounted above the upwardly directed nozzles. Means are provided for translating rotation of the rack into oscillation of the guide vanes so as to swing the jets of water emitted by the upwardly directed nozzles back and forth through predetermined arcs against dishes, etc. on the rack.

This invention also contemplates a dish washer which is mounted upon an arm and cooperating, stationary frame suitable connections being provided so that the dish washer may be pulled out of position beneath a customary kitchen sink and raised to an operative position above the sink. Supply of water and drainage is thus made convenient and simple.

It is an object of this invention to provide a dish washer of simple construction.

It is a further object of this invention to provide a washer wherein the objects to be washed are rotated and sprayed by oscillating jets of cleansing liquid simultaneously, whereby a very desirable scouring and cleansing action takes place.

It is a further object of this invention to provide a dish washer which may be stored under the sink when not in use.

It is a further object of this invention to provide a dish washer requiring no motor drive.

Other and allied objects will become apparent to those skilled in the art upon a careful examination and perusal of the specification, drawings, and appended claims. To facilitate understanding, reference will be had to the following drawings, in which:

Figures 1, 2, 3:
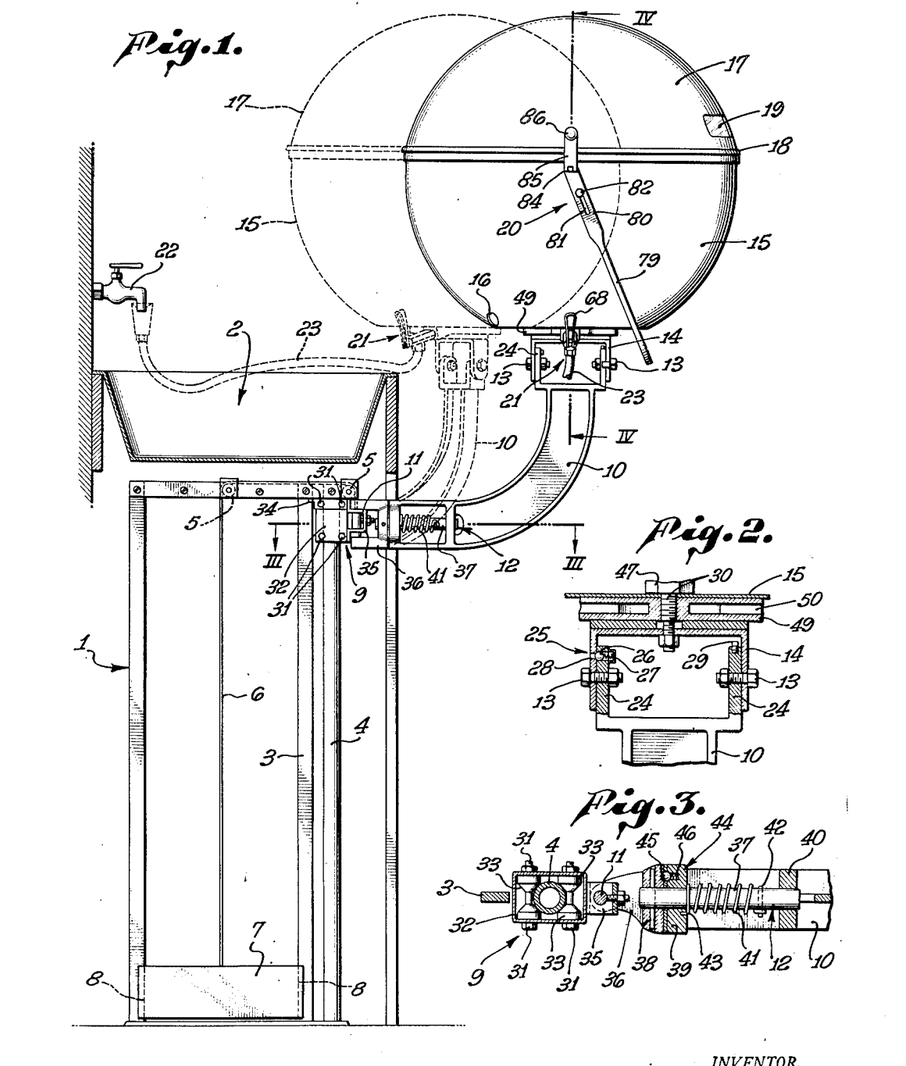
Fig. 1 is a side elevation of an exemplary form of the entire apparatus when it has been moved to its upward position. The solid lines show the apparatus before being rotated into position over the sink; the dashed lines show the apparatus partially rotated into position over the sink.
Fig. 2 is a vertical section taken through the pivotal mounting of the bowl on the curved supporting arm.
Fig. 3 is a section taken along III—III of Fig. 1.

In the illustrated, exemplary form of my invention shown in Fig. 1, a vertical frame, indicated generally at 1, is fixedly mounted on the side wall of the surface underneath a sink, indicated generally at 2. A vertical, upright bar member 3 and a vertical, upright tubular member 4 are mounted slightly separated adjacent the side of the frame 1 nearest the opening into the space below the sink. Curved sheaves or rollers 5 are mounted in the upper end of the frame and are adapted to carry a wire 6 connected at one end thereof to a counterbalancing weight 7, which is vertically grooved at each end thereof as indicated at 8 so as to engage the vertical bar 3 and similar vertical bar at the rear end of the frame 1 for guiding the counterweight in its movement. The other end of the wire 6, after having passed over the grooved sheaves 5, is adapted to be operably connected to a slidable fitting, indicated generally at 9, which is adapted to surround and engage the vertical tubular member 4 and to be vertically reciprocated with respect thereto. The detailed construction of the slidable fitting 9 will be described more particularly hereinafter.

Attached to the forward end of the slidable fitting 9 is a curved supporting arm 10 adapted to pivot horizontally about a vertical pivotal connection at 11. The curved supporting arm 10 is also adapted to pivot about a horizontal axis indicated at 12. This pivotal connection will be described more particularly hereinafter.

The upper end of the curved supporting arm 10 is pivotally attached at 13 to a yoke 14 which is mounted upon the bottom of a hollow, concave bowl 15. The axis at 13 at the upper end of the curved arm 10 is horizontal and parallel to the axis 12 adjacent the lower end of the curved arm 10. The vertical tube 4 of the frame 1 and the vertical axis at 11, where the lower end of the curved arm 10 is pivotally connected to the fitting 9, and the vertical axis of symmetry of the concave bowl 15 are all parallel. This arrangement makes it possible to move the dish washer from a folded-up position under the sink into an operative position over the sink, and vice versa, the sequence of operations of which is partially shown in Figs. 18, 19, 20 and 21.

The hollow, concave bowl 15 is provided with a water outlet adjacent the bottom thereof at 16, through which water and debris washed from the dishes may be discharged directly into the sink 2 when the washer is mounted as shown and in opertaive, dash-line position above the sink. A hollow, concave corner 17 is provided with a circumferential lip 18 adapted to engage the edge of the hollow, concave bowl 15 for enclosing the washing region therein. The cover 17 is provided with a transparent window 19 so that the washing operation may be viewed.

Manually actuatable opening handle means indicated generally at 20 is provided for opening and closing the dish washer. Manually actuatable valve means, indicated generally at 21, is provided for controlling and proportioning the supply of water under pressure coming from tap 22 through hose connection 23 which is delivered to the driving nozzle and washing nozzles contained within the bowl 15, the exact details of which will be more particularly described hereinafter.

*Connection of supporting arm and concave bowl*

Fig. 2 illustrates the details of the connection from the curved supporting arm 10 (best shown in Fig. 1) to the bottom of the concave bowl 15 (best shown in Fig. 1) and is a sectional view taken in the same direction as Fig. 1. The upper end of the curved supporting arm 10 is shown provided with parallel ends 24 adapted to fit within the yoke 14 and pivotally connected thereto at 13 by suitable means such as bolts and nuts, pivot pins, or the like. Spring-biased restraining means, indicated generally at 25, comprising a ball 26 in the example shown loaded by spring 27 mounted within a chamber connected to the yoke 24, biases the ball 26 into an aperture 28 in the yoke 14 when in the position shown in Fig. 2, thus normally maintaining the yoke 14 in a vertical position with respect to the end 24. This is for maintaining the dish washer in a vertical position when a load of dishes is carried by and being washed therein. A pin 29 is mounted at the end of one side of the end 24 and is adapted to abut a stop pin on the yoke 14, not shown, for restricting the rotary movement of the yoke 14 with respect to the end 24. The spring-biased ball 26 may selectively cooperate with another aperture in end 24 to hold the body portion of the washer in upright position when arm 10 is horizontal.

The bottom of the hollow, concave bowl 15 is connected by suitable bolt means 30 to the yoke 14 with portions of a casting 49 therebetween. This casting will be described hereinafter. This is normally a rigid, non-rotatable connection, but by releasing the nut, the concave bowl 15 may be rotated about an axis passing vertically through the bolt 30. This is generally used when it is desired to position the outlet 16 with respect to the curved arm 10.

*Connection of supporting arm and slidable vertically reciprocable fitting to the frame*

Fig. 3 is a vertical view of the connection of the curved supporting arm 10 to the slidable fitting 9 and the connection of the slidable fitting 9 to the vertical tube 4 of the frame 1. The slidable, vertical, reciprocable fitting, indicated generally at 9, includes four pivot pins or shafts 31 which are arranged in two vertically spaced, horizontal planes, the upper plane having two spaced, parallel shafts 31 and the lower plane having two similar spaced, parallel shafts 31. The shafts 31 in the example disclosed are mounted in a rectangular box 32, open at the top and bottom, and are in the form of stud bolts.

Rotatably mounted upon each of the shafts 31 adjacent opposite walls of the rectangular box 32 are tapered rollers or sheaves 33 adapted to have rolling contact with tubular member 4. A guide tit 34 (which may be furcated) cooperates with the vertical bar 3 to guide the slidable fitting 9 during vertical reciprocation thereof.

Means are provided for swinging the arm 10 upon a vertical axis adjacent frame 1 and pivoting it about a horizontal axis. Affixed to the outer end of box 32 is a member 35 which extends into a yoke 36 and is pivotally attached thereto by a vertical pin 11. Mounted in the outer end of the yoke 36, which is circular, is a horizontal, outwardly extending stud 37 which is non-rotatably mounted with respect to the yoke 36 and retained therein by a retaining pin 38. The lower end of the supporting arm 10 is provided with a circular face 39 adapted to cooperate with the circular outer end face of the yoke 36. The face 39 is perforated and stud 37 extends therethrough and rotates with respect thereto. The outer end of the stud 37 rotatably extends through a similar aperture in wall 40 in the supporting arm 10. Thus the stud 37 is fixed with respect to the circular outer end portion of the yoke 36 but is rotatably mounted with respect to the portions 39 and 40 of the curved supporting arm 10.

A torsion spring 41 is mounted upon and around the horizontally extending stud 37 and is positioned between the portions 39 and 40 of curved supporting arm 10. One end of the torsion spring 41 is connected to a pin 42 extending through the horizontal stud 37. The other end of the torsion spring 41 is seated in a small recess in the circular portion 39 in the end of the curved supporting arm 10 and is affixed thereto as indicated at 43. Releasable means for holding arm 10 in selected positions on stud 37 are provided, such as a spring-biased restraining means, indicated generally at 44, including a ball 45 loaded by a spring 46 mounted in a recess in end of arm 10, and is adapted to engage a corresponding recess in the circular end portion of 36 when in the position shown in Fig. 3, thus normally maintaining the curved supporting arm 10 in the position shown in Figs. 3 and 1 with respect to the frame 1. When it is desired to put the washer away and the sequence of operations in Figs. 18, 19, 20, and 21 is initiated, the curved supporting arm 10 may be rotated with respect to the yoke 36 and the frame 1 against the action of the torsion spring 41 from the position shown in Fig. 18 to the positions shown in Figs. 19 and 20. Spring 41 assists in raising the device.

*General structure of dish washer operating mechanism*

Figures 4, 5, 6:
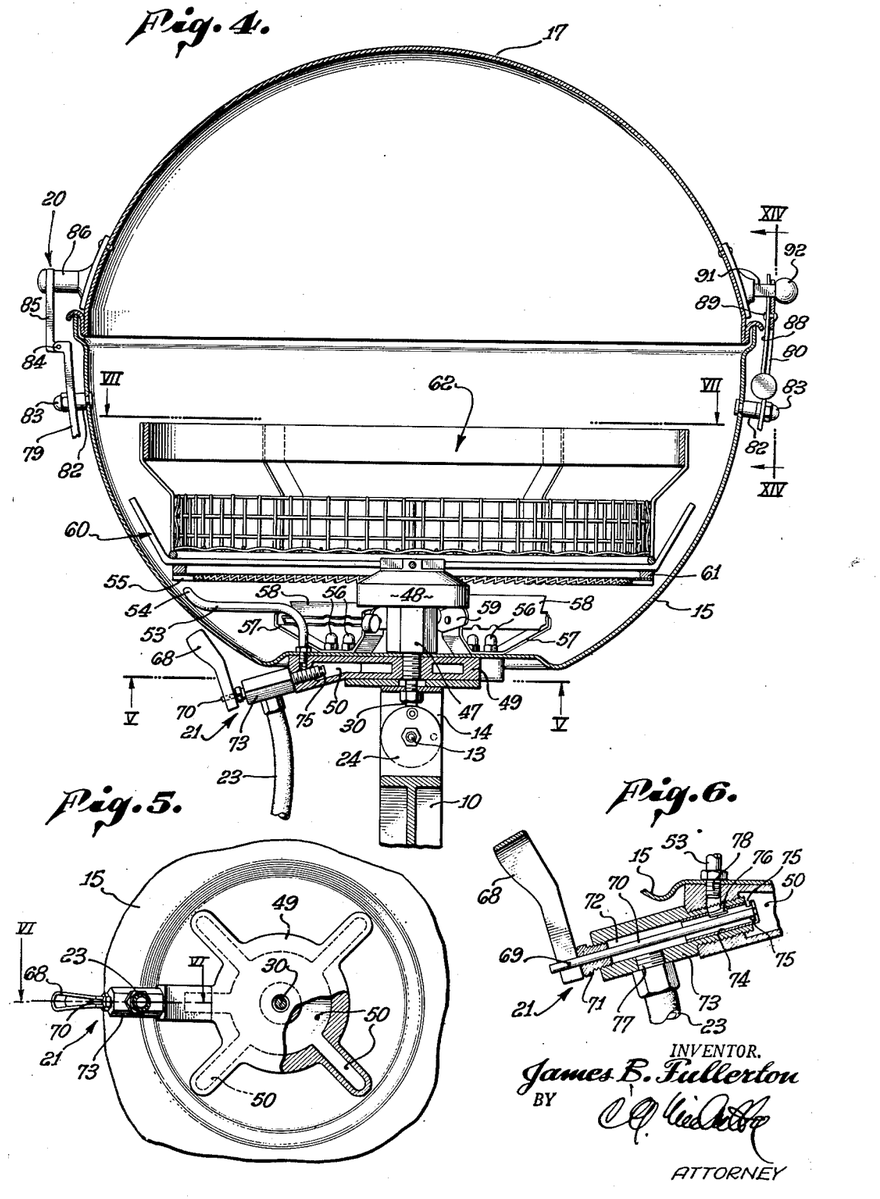
Fig. 4 is a section taken along IV—IV of Fig. 1
Fig. 5 is a section taken along V—V of Fig. 4.
Fig. 6 is a section of the control valve and actuating handle therefor taken along VI—VI of Fig. 5.
Figures 7, 8, 9, 10:
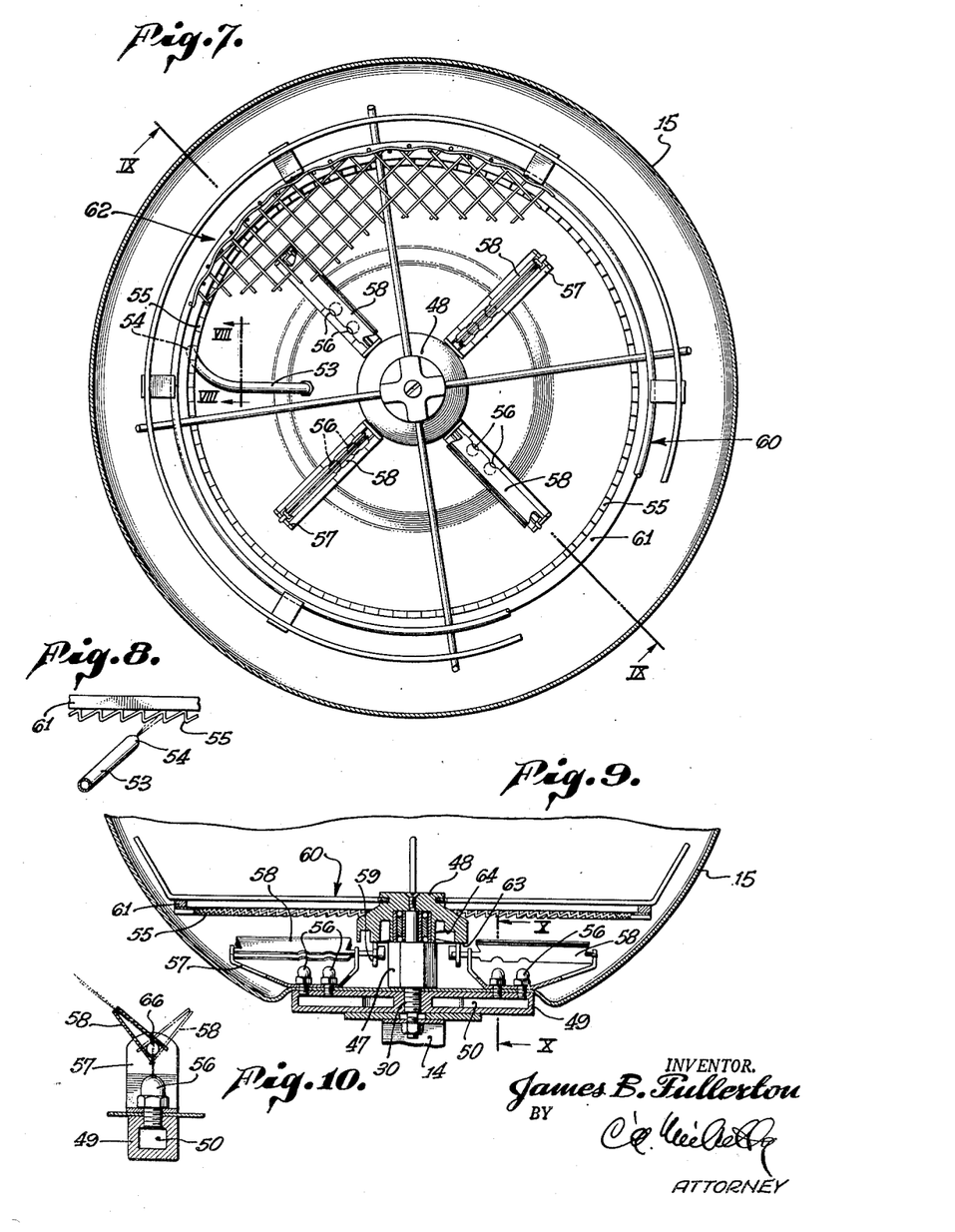
Fig. 7 is a view taken along VIII—VIII of Fig. 4.
Fig. 8 is a fragmentary view taken along VIII—VIII of Fig. 7 of the driving nozzle and reaction surface.
Fig. 9 is a view taken along IX—IX of Fig. 7.
Fig. 10 is a view taken along X—X of Fig. 9.

Figs. 4 and 7 illustrate the construction of the body portion of the dish-washing apparatus. Referring to Fig. 4, the bolt 30 which connects the yoke 14 to the lower portion of the hollow concave bowl 15 is connected to an upwardly extending hexagonal member 47 coaxial with the axis of symmetry of the bowl 15. The upper end of the hexagonal member 47 is provided with a stud, not shown in Figs. 4 and 7, upon which a hub member 48 is rotatably mounted with suitable bearing means or other anti-friction device (not shown) positioned therebetween. The lower end of said hub 48 is provided with cam means in the form of two separate, distinct, annular tracks oppositely, annularly disposed from a horizontal plane. These cam means are not shown in Figs. 4 and 7.

A casting 49 having chamber 50 therein in the form of a plurality of radial passages connected to each other is mounted between the upper surface of the yoke 14 and the bottom of the hollow concave bowl 15 by means of the bolt 30. The manually actuatable water control valve means, indicated generally at 21, is at one side of the casting 49 and is adapted to control the entry of water into the chamber 50 in the casting 49.

Also threadably connected to 49 in operative relation to valve 21 is a conduit 53 which extends upward into the hollow concave bowl 15 to a nozzle or orifice at 54 which is tangentially directed against a reaction surface 55, carried by a rotatable rack. The details of the reaction surface 55 and associated structures will be described hereinafter. The manually actuatable control valve is adapted to simultaneously control and proportion the flow of water from the hose 23 connected to the water tap 22 through the valve 21 into the chamber 50 and also the flow into the conduit 53, the purpose of which will be explained hereinafter.

Positioned above and connected to the enclosure 50 are upwardly directed nozzles 56 provided with orifices adapted to spray fine jets of water under pressure in an upward direction. Suitable mounting brackets 57 are fixed to the bottom of the concave bowl 15 and are adapted to pivotally mount oscillatable guide vanes 58 closely adjacent to and positioned above the orifices in the nozzles 56. The guide vanes 58 are longitudinal members having two angularly related sides open at the bottom thereof for receiving the upwardly directed sprays of water from the nozzles 56 and are provided with outlets along the upper narrower surface thereof for swinging the sprays of water passed therethrough back and forth through predetermined arcs. The structure and relationship of an oscillatable guide vane 58 with respect to a nozzle 56 is best shown in Fig. 10, wherein the solid lines show the guide vane at one extreme of its predetermined arc and the dash lines show the guide vane in the other extreme position.

Means are provided for translating rotation of rack 60 into oscillation of vanes 58. In the exemplary form the inner ends of vanes 58 are connected to cam followers indicated generally at 59, which are adapted to cooperate with and follow cam means on the under surface of the hub 48 which is rotatably mounted with respect to the hexagonal member 47 and the hollow concave bowl 15.

Attached to the upper surface of the hub 48 is a supporting rack 60 comprising radial spokes upwardly bent at the outer edges thereof. Connected to the lower surface of the supporting rack 60 is an annular ring 61 provided with the reaction surface 55 against which the water emitted from the orifice 54 of the conduit 53 connected to the pressurized, water-spray, manually actuatable control valve 21 is adapted to be forcibly ejected. This will cause the reaction surface 55, annular ring 61 and supporting rack 60 and the hub 48 connected thereto to be rotated about the stud extending upwardly from the hexagonal member 47 connected to the bottom of the hollow concave bowl 15. The rotation of the hub 48 also rotates the cam means on the under surface thereof, thus actuating the cam followers 59 and oscillatable guide vanes 58 connected thereto, thus oppositely swinging streams of water emitted by the upwardly directed nozzles 56 back and forth through predetermined arcs in a generally upward direction.

A dish-holding basket 62, portions of which may be of wire mesh construction, is adapted to rest upon the supporting rack 60 and to be rotated thereby. Thus the supporting rack 60 and dishes carried thereby will be simultaneously rotated and sprayed by oscillating streams of hot water for cleansing same.

Oscillating guide vane mechanism

Figure 11:
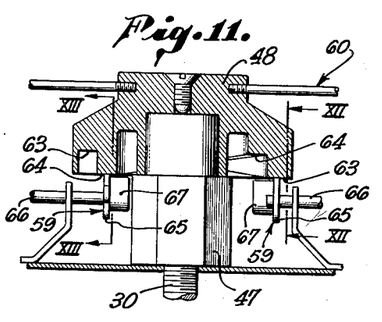
Fig. 11 is an enlarged fragmentary view, partially in section, of the cam means and cam follower means similar to that shown in Fig. 9.

Figs. 9, 10, 11, 12 and 13 most clearly illustrate the cam means on the under surface of the hub 48 and cam followers 59 cooperating therewith which control the oscillating vanes 58. Referring to said drawings, the under surface of the hub 48 has an outer, annular cam track 63 and an inner cam track 64. The outer cam track in the positions shown in Figs. 9 and 11 is deeply recessed at the lefthand side and recessed not at all at the righthand side with an even rate of change therebetween. The inner cam surface 64 in the position shown in Figs. 9 and 11 is recessed not at all on the lefthand side and recessed to the maximum depth on the righthand side with an even rate of change therebetween. Thus it can be seen that the two cam surfaces 63 and 64 are inclined in opposite directions.

The cam followers 59 on opposite sides of the cam are always in engagement with different cam tracks. In other words, as viewed in Fig. 11, the lefthand cam 59 is in engagement with the inner cam track 64 and the righthand cam follower 59 is in engagement with the outer cam track 63. The purpose of this is so that the guide vanes 58 will be continuously oscillating during operation of the device and opposite guide vanes will oscillate in opposite directions, as best shown in Fig. 7, wherein the upper lefthand and lower righthand guide vanes 58 are at opposite extremes of their predetermined arcuate swing, and the upper righthand and lower lefthand guide vanes 58 are both perpendicular, since their cam followers 59 are at the midpoint of the slope on their respective cam tracks.

Figure 12:
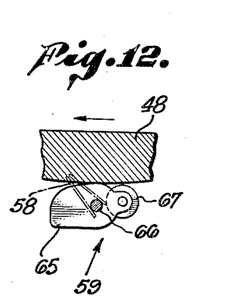
Fig. 12 is a view taken along XII—XII of Fig. 11.
Figure 13:
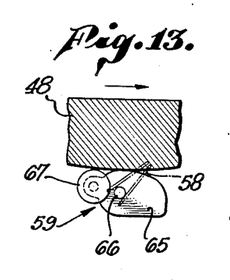
Fig. 13 is a view taken along XIII—XIII of Fig. 11.

The structure of the cam followers 59 shown in Fig. 11 and positioned on opposite sides of the cam tracks 64 are illustrated in Figs. 12 and 13. Figs. 12 and 13 also show the direction the respective guide vanes 58 will assume. The cam followers, indicated generally at 59, comprise cam contacting elements 65 pivotally mounted at 66, which is also the axis about which the oscillatable guide vanes 58 pivot, and counterweights 67, so that the cam contacting member 65 will be maintained in contact with the cam tracks 63 and 64 at all times.

Manually actuatable control and proportioning valve

The control and proportioning valve, indicated generally at 21 comprises a handle 68 pivotally mounted at 69 with respect to a longitudinal rod 70, which slidably and rotatably extends through an end plug 71 and the bore 72 of body member 73. The outer end of the rod 70 carries a hollow sleeve 74 thereon adapted to slidably and rotatably engage the cylinderical walls of the chamber 72. The hollow sleeve is provided with apertures 75 adjacent the outer, closed end thereof where it is attached to the rod 70. The sleeve 74 also has an aperture 76 in the side thereof. The hose connection 23, bringing water under pressure from the tap 22, connects with an inlet 77 into the bore 72. An outlet 78 is positioned adjacent the aperture 76 in the sleeve 74 and connects to the conduit 53, which goes to the driving nozzle 54 adapted to impinge the reaction surface 55 for rotating the supporting rack 61.

It should be noted that the handle 68 may be either rotated about the axis of the rod 70 or it may be rotated about the axis of the pin 69 passing transversely through the rod 70. The purpose of this is as follows. When the apparatus is turned off, the handle 68 is in its extreme downward position, having been rotated in a counterclockwise direction about the pin 69 passing through the rod 70. This moves the entire rod 70 toward the left, as viewed in Fig. 6, thus sliding the sleeve 74 longitudinally within the bore. This closes off the aperture 75 in the outer end of the hollow sleeve 74 and prevents any water from passing from bore 72 out into the chamber 50 in the casting 49 which connects with the upwardly directed washing nozzles 56. Thus no water is delivered to the said nozzles. At the same time, the aperture 76 in the side of the hollow sleeve 74 has been moved away from the opening 78 connected with the conduit 53 going to the driving nozzle 54 against the reaction surface 55 for rotating the supporting rack 61 and dish-carrying basket 62 carried thereby, which, as hereinbefore mentioned, causes rotation of the cam surfaces 63 and 64 and actuation of the cam followers 59 and oscillatable guide vanes 58. Thus said rotation ceases and the entire apparatus is at rest.

When it is desired to start the apparatus, the handle is moved into the position shown in Fig. 6, which allows a full stream of water under pressure to pass through aperture 75 in the hollow sleeve 74 into the chamber 50 and to the nozzles 56. This also allows a full stream of water to pass through aperture 76 in the side of the sleeve 74 into the conduit 53 to the driving nozzle 54 for initiating rotation of the supporting rack 61 and dish-carrying basket 62. After initiation of rotation of the supporting rack 61 the water ejected from the nozzle 54 does not need to possess as much force to maintain rotation of said supporting rack, even though it is still desired to deliver the full supply of water to the nozzles 56. This may be accomplished by rotating the handle 68 and rod 70 about the axis of the rod 70, which moves the aperture 76 in the side of the hollow sleeve 74 away from the opening 78 leading to conduit 53 and driving nozzle 54, reducing the amount of water sent to nozzle 54 while a full supply of water continues to be supplied through the aperture 75 into the chamber 50 and to the washing nozzles 56.

Handle

Figure 14:
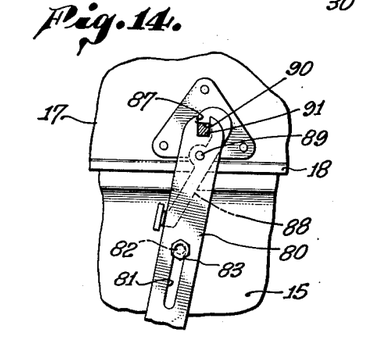
Fig. 14 is a view taken along XIV—XIV of Fig. 4.

The handle means, indicated generally at 20, comprises an arcuate, curved gripping handle 79, each end of which is provided with a flat portion 80 having a longitudinal slot 81 therein adapted to engage outwardly projecting posts 82 fixedly mounted on the outer, upper sides of the hollow, concave bowl 15. The outer ends of the posts 82 are provided with retaining nuts 83 larger than the slots 81 for retaining the flat portions 80 in engagement therewith. The end of the lefthand flat portion 80, as viewed in Fig. 4, has pivotally attached thereto at 84 an upwardly extending linkage 85 which is pivotally attached and retained on a post 86 fixed upon the cover 17. It should be noted that the pivotal connection 84 is adapted to pivot about an axis perpendicular to the pivoted axis at 86. The other end of the other flat member 80 of the handle 20 is provided with a recess 87 at the end thereof and a manually actuatable latch 88 pivoted at 89 on the flat plate 80 and having an abutting locking surface 90 adapted to cooperate with the recess 87. A square stud 91 is pivotally mounted upon the cover 17 and is adapted to be positioned within the recess 87 in the end of the flat portion 80 of the handle 20. When so positioned, if the latch 88 is in the position shown in Fig. 14, the locking end 90 thereof non-rotatably locks the shaft 91 within the recess 87. The outer end of the shaft 91 has a retaining ball 92 thereon.

Figure 15:
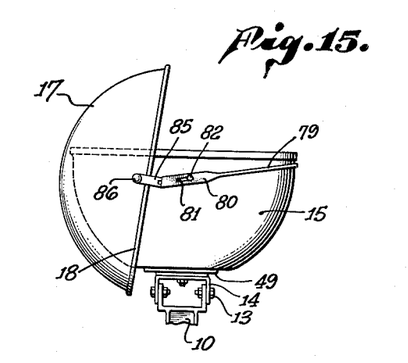
Fig. 15 is an elevational view of the apparatus showing the dish washer in open position.

When it is desired to open the apparatus from closed position, as shown in Fig. 1, the gripping portion 79 of the handle 20 is grasped and shoved upwardly, moving the flat portions 80 rectilinearly with respect to the posts 82 on the concave, hollow bowl 15, so that said posts slide within the slots 81 until they abut the lower ends thereof. This lifts the cover 17 from the hollow bowl portion 15 slightly. Then the gripping portion 79 on the handle 20 is rotated about the pivot point 82 in a counterclockwise direction, as viewed in Figs. 1 and 15, until the cover 17 is in the position shown in Fig. 15. In this position the dish-carrying basket 62 may be loaded directly with dishes or it may be removed from the hollow bowl 15 and loaded externally thereof and then replaced therein, if so desired.

Figure 16:
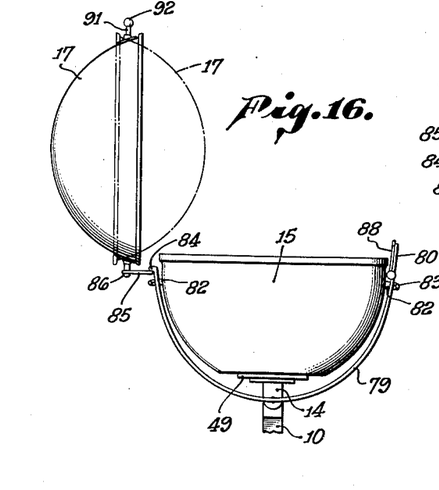
Fig. 16 is a view in elevation of the dish washer showing one stage of the operation whereby the cover may be reversed and fitted inside the bowl prior to placing the entire apparatus under the sink when putting the dish washer away.
Figure 17:
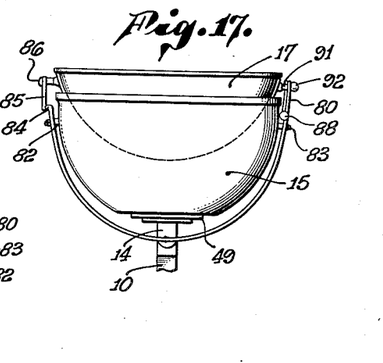
Fig. 17 is a view in elevation showing the second stage of the operation mentioned in connection with Fig. 16.
Figure 18:
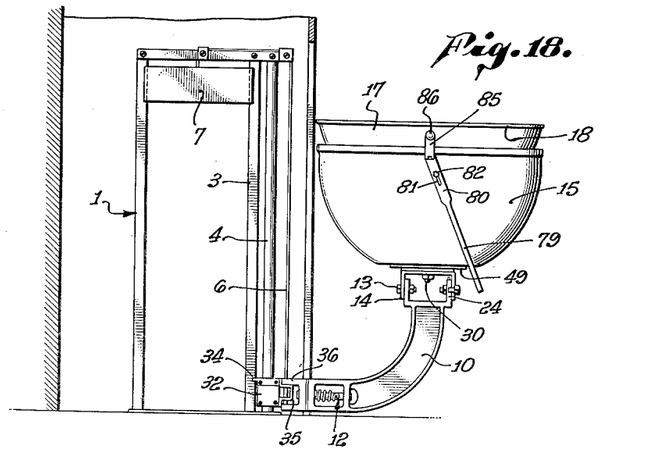
Fig. 18 is a view in elevation showing the dishwashing apparatus in its lower position after having been vertically reciprocated with respect to the frame.
Figure 19:
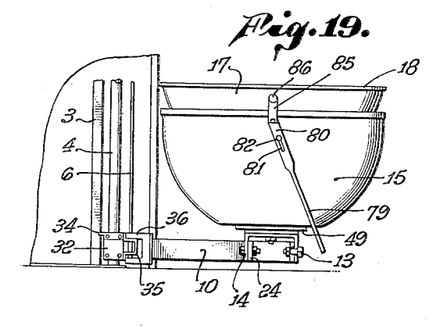
Fig. 19 is a view in elevation showing the operation subsequent to that shown in Fig. 18 wherein the curved supporting arm has been rotated adjacent the point where it connects with the frame.
Figure 20:
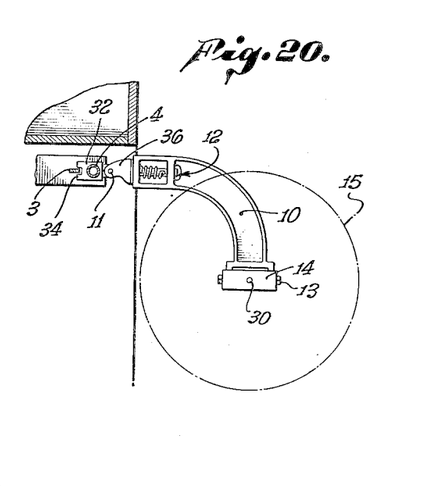
Fig. 20 is a top plan view of Fig. 19.
Figure 21:
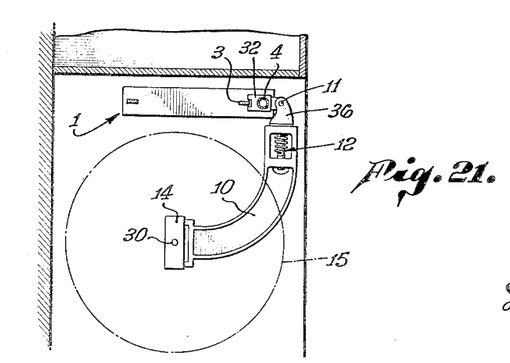
Fig. 21 is a top plan view of the final operation in the sequence of operations shown in Figs. 16, 17, 18 and 19–20, wherein the curved supporting arm carrying the dish-washing apparatus has been pivoted at a point where it engages the vertical frame so as to swing the dish washer under the sink.

When it is desired to move the apparatus from above the sink to the storage position shown in Fig. 21 below the sink, the latch 88 is opened so as to remove the locking end 90 from contact with the square surface of the shaft 91 in the recess of the righthand flat portion 80 of the handle 20. As shown in Fig. 16, the cover 17 may then be lifted up and pivoted about the pivot point 84 between the linkage 85 and the upper end of the flat plate 80 on the opposite side of the dish-washing apparatus until the cover 17 is in the position shown in solid lines in Fig. 16. Then the cover 17 may be pivoted about a vertical axis passing through the pivotal connection at 86 into the position shown in dashed lines in Fig. 16, and swung down with the curvature thereof within the concave lower bowl 15 by means of the pivotal connection 84 into the position shown in Fig. 17. The apparatus may be then vertically reciprocated with respect to the frame into its lowermost position, as shown in Fig. 18. The curved arm 10 may then be pivoted with respect to the yoke 36 against the action of the torsion spring 41 into the position shown in elevation in Fig. 19 and in plan view in Fig. 20, and finally the curved arm 10 may be pivoted about the vertical pivot point 11 in the fitting 9 into the position shown in Fig. 21 below the sink.

It will be noted that, in operation the washing nozzles impinge upon and thoroughly wash both sides of dishes stacked on edge in the revolving tray or basket. The semispherical cover effectively redirects the spray of wash water upon the dishes or other objects being washed. The cover, moreover, nests in the bowl when not in use, and reduces the bulk of the device. Means have been provided whereby the device may be installed in an easily accessible position in space which is normally available in existing homes and the usually available hot water may be effectively used to wash dishes thoroughly.

It should be understood that numerous modifications and variations of this idea are possible and are intended to be included herein. For example, other types of covers and opening handles therefore may be utilized. The curved supporting arm and slidable frame may be modified in numerous possible ways. It may be desired to mount the apparatus in some position other than beneath a sink, in which case the mounting apparatus may be modified within wide limits. It may be desired to dispense with the mounting apparatus described and illustrated herein entirely and fixedly or otherwise mount the bowl and washing apparatus. The supporting basket may be connected directly to the reaction surface rather than through the medium of the supporting rack, which may be dispensed with, if desired. The oscillating guide vanes may be modified in numerous ways and need not necessarily oscillate in opposite directions. The washing nozzles may be positioned differently, if desired, and may be combined with oscillating guide means into one structure for delivering oscillating streams of water. The cam mechanism may also be modified in numerous ways. Numerous equivalent water control and proportioning valves may be used. It may be desirable to convert the apparatus from an open cycle system to a closed cycle system where the liquid flow from the outlet of the dish water is returned to the inlet of the dish wash. In such case the water may be suitably pressurized and heated between said outlet and inlet, if so desired, and suitable soap, detergent, or other cleansing agent may be mixed with the liquid. The entire apparatus may be fixedly mounted and an outlet hose connected to the outlet for directing the effluent water to a sink or the like.

The examples described and illustrated herein are exemplary only and are not intended to limit the scope of this invention, which is to be interpreted in the light of the appended claims only.

I claim:
1. A dish-washing machine comprising: a body portion including a bowl and a closure therefor; a supporting rack rotatably mounted within the bowl about a vertical axis; a plurality of nozzles beneath the rack within the bowl arranged about said axis; fluid pressure means for rotating the rack; oscillatable hollow guide vanes between the nozzles and the rack for conducting and varying the direction of the fluid emitted by the nozzles to form a continuous sheet of spray; and means coaxial with said vertical axis for translating rotation of the rack into oscillation of the guide vanes.

2. A dish-washing machine comprising: a hollow body portion; a supporting rack rotatably mounted within the body portion; fluid-pressure means for rotating the rack; and washing means including a hollow elongated oscillatable vane for receiving therewithin a circular cross-section spray and transforming said spray to a swinging sheet of fluid adapted to be directed upon the dishes to be washed; a conduit conducting fluid under pressure to said fluid-pressure means and said washing means; and manually actuatable valve means for controlling and proportioning the fluid under pressure delivered to the rack rotating means and the washing means.

3. A dish-washing machine comprising: a hollow body portion; a supporting rack rotatably mounted about a vertical axis within the body portion; washing nozzle means within the body portion adapted to spray fluid toward the rack; fluid pressure means for rotating the rack; movable elongated hollow guide means each disposed radially with respect to said axis of rotation and positioned between the washing nozzle means and the rack for conducting and transforming the sprayed fluid emitted by said washing nozzle means into a sheet of fluid; and means rotatable about said axis of rotation for moving the guide means concurrently with rotation of the rack.

4. In a dash-washing machine of the character stated in claim 3: a single conduit for supplying fluid under pressure to said means for rotating the rack and said washing nozzles, and a manually actuatable valve means in the conduit, said valve being arranged to vary the proportion of fluid supplied to said rotating means with respect to the nozzles.

5. A dish-washing machine comprising: a hollow body portion; a supporting rack rotatably mounted about an axis of rotation within a washing zone of the body portion; washing nozzle means within the body portion adapted to spray fluid toward the washing zone; fluid pressure means for rotating the rack; a plurality of guide vane means oscillatable about axes radially disposed to said axis of rotation and positioned between the washing nozzle means and the washing zone for guiding sprayed fluid emitted by said washing nozzle means into radially extending sheets of fluid; and means for oscillating the guide vane means concurrently with rotation of the rack.

6. A dish-washing machine comprising: a hollow body portion; a closure therefor; a supporting rack rotatably mounted within a washing zone of the body portion; upwardly directed washing nozzle means within the body portion beneath the rack adapted to spray fluid upwardly toward the washing zone; fluid pressure means for rotating the rack; movable hollow guide means positioned in diametrically opposed relation in a planar zone lying between the washing nozzle means and the rack for guiding the sprayed fluid emitted by said washing nozzle means in sheet form into said washing zone; and means coaxial with said vertical axis for moving the guide means concurrently with rotation of the rack.

7. In a dish-washing machine of the character stated in claim 6: a single conduit for supplying fluid under pressure to said means for rotating the rack and said washing nozzles, and a manually actuatable valve means in the conduit, said valve being arranged to vary the proportion of fluid supplied to said rotating means with respect to the nozzles.

8. A dish-washing machine comprising: a hollow body portion having an opening; a closure therefor; a supporting rack rotatably mounted within the body portion, said rack being provided with a reaction surface; driving nozzle means for jetting fluid under pressure against the reaction surface, whereby the rack is rotated thereby; upwardly directed washing nozzle means within the body portion beneath the rack adapted to spray fluid upwardly toward the rack; movable hollow guide means positioned between the washing nozzle means and the rack for guiding and conducting the sprayed fluid emitted by said washing nozzle means into elongated sheet forms; and means including cam means for moving the guide means concurrently with and in response to rotation of the rack.

9. A dish-washing machine comprising: a hollow body portion including a drainage outlet and an opening; a closure for said opening; a supporting rack rotatably mounted about a vertical axis within the body portion; a plurality of upwardly directed washing nozzle means within the body portion beneath the rack adapted to spray fluid upwardly toward the rack; fluid pressure means for rotating the rack; a plurality of movable elongated hollow guide vanes extending radially from said axis and positioned between the washing nozzle means and the rack for simultaneously, oppositely conducting fluid sprays emitted by said washing nozzle means; and means for moving the guide vane means concurrently with rotation of the rack.

10. A dish-washing machine comprising: a hollow body portion including a drainage outlet and an opening; a closure for said opening; a supporting rack rotatably mounted within the body portion; a plurality of upwardly directed washing nozzle means within the body portion beneath the rack adapted to spray fluid upwardly toward the rack; fluid pressure means for rotating the rack; a plurality of movable guide vanes positioned between the washing nozzle means and the rack for simultaneously, oppositely moving fluid sprays emitted by said washing nozzle means; and means for moving the guide vane means concurrently with rotation of the rack; a single conduit for supplying fluid under pressure to said means for rotating the rack and said washing nozzles, and a manually actuatable valve means in the conduit, said valve being arranged to vary the proportion of fluid supplied to said rotating means with respect to the nozzles.

11. A dish-washing machine comprising: a hollow body portion including a drainage outlet having an opening; a closure for said opening; a supporting rack rotatably mounted within the body portion; a plurality of upwardly directed washing nozzle means within the body portion beneath the rack adapted to spray fluid upwardly toward the rack; fluid pressure means for rotating the rack; a plurality of oscillatable elongated hollow guide vanes positioned between the washing nozzle means and the rack for simultaneously, oppositely oscillating and conducting fluid sprays emitted by said washing nozzle means; and means oscillating the guide vane means concurrently with and in response to rotation of the rack.

12. A dish-washing machine comprising: a hollow body portion including a drainage outlet therefor; a supporting rack rotatably mounted within the body portion, said rack being provided with a reaction surface; driving nozzle means for jetting fluid under pressure against the reaction surface, whereby the rack is rotated thereby; washing nozzle means within the body portion adapted to spray fluid toward a washing zone; movable hollow guide means having top and bottom elongated openings positioned between the washing nozzle means and the washing zone for guiding and conducting the sprayed fluid emitted by said washing nozzle means; and cam means for oppositely moving the guide means concurrently with rotation of the rack.

13. A dish-washing machine comprising: a hollow body portion including a drainage outlet therefor; a supporting rack rotatably mounted within the body portion, said rack being provided with a reaction surface; driving nozzle means for jetting fluid under pressure against the reaction surface, whereby the rack is rotated thereby; washing nozzle means within the body portion adapted to spray fluid toward a washing zone; a plurality of oscillatable hollow guide vane means having elongated opposed openings positioned between the washing nozzle means and the washing zone for passing and transforming the sprayed fluid emitted by said washing nozzle means into a virtually continuous sheet of fluid; and cam means for oppositely oscillating the guide vane means concurrently with rotation of the rack.

14. A dish-washing machine comprising: a hollow body portion including a drainage outlet therefor; a supporting rack rotatably mounted within the body portion, said rack being provided with a reaction surface; driving nozzle means for jetting fluid under pressure against the reaction surface, whereby the rack is rotated thereby; washing nozzle means within the body portion adapted to spray fluid toward a washing zone; a plurality of oscillatable guide vane means positioned between the washing nozzle means and the washing zone for guiding the sprayed fluid emitted by said washing nozzle means; and cam means for oppositely oscillating the guide vane means concurrently with rotation of the rack; a single conduit for supplying fluid under pressure to said means for rotating the rack and said washing nozzles, and a manually actuatable valve means in the conduit, said valve being arranged to vary the proportion of fluid supplied to said rotating means with respect to the nozzles.

15. A dish-washing machine comprising: a hollow body portion including a drainage outlet therefor; a closure for the body portion; a supporting rack rotatably mounted within the body portion, said rack being provided with a reaction surface; driving nozzle means for jetting fluid under pressure against the reaction surface whereby the rack is rotated thereby; upwardly directed washing nozzle means within the body portion beneath the rack adapted to spray fluid upwardly toward the washing zone; movable hollow guide means positioned between the washing nozzle means and the rack for receiving the sprayed fluid emitted by said washing nozzle means and discharging said fluid in the form of a sheet; and cam means for oppositely moving the guide means concurrently with and in response to rotation of the rack.

16. In a dish-washing machine, the combination of: a hollow body portion including a removable closure therefor; a rack mounted for rotation about a vertical axis within said body portion; a reaction surface carried by said rack; a driving nozzle positioned to eject fluid against said surface for rotating said rack; a plurality of washing nozzles beneath said rack extending radially with respect to said axis; a plurality of hollow elongated vanes, each operably positioned with respect to a washing nozzle and each provided with an elongated inlet opening and outlet opening; means for oscillating said vanes about a horizontal radial axis; and conduit means for supplying fluid under pressure to said driving nozzle and said washing nozzles.

17. A machine as stated in claim 16 wherein the outlet opening of each vane is narrower in width than the inlet opening thereof.

18. In a dish-washing machine, the combination of: a hollow body portion including a removable closure therefor; a rack mounted for rotation about a vertical axis within said body portion; a reaction surface carried by said rack; a driving nozzle positioned to eject fluid against said surface for rotating said rack; a plurality of washing nozzles beneath said rack extending radially with respect to said axis; a plurality of hollow vanes having elongated passageways to receive fluid from said washing nozzles and to eject said fluid in sheet form; means for oscillating said vanes about a horizontal radial axis; and conduit means for supplying fluid under pressure to said driving nozzle and said washing nozzles.

19. In a dash-washing machine, the combination of: a hollow body portion including a removable closure therefor; rack means mounted for rotation within said body portion; a reaction surface carried by said rack means; a driving nozzle positioned to eject fluid against said surface for rotating said rack means; a plurality of hollow vanes having elongated converging passageways to receive fluid from said washing nozzles and to discharge said fluid in the form of a continuous sheet of fluid; conduit means for spraying fluid under pressure to said driving nozzle and said washing nozzles; and means for oscillating said hollow vanes including cam means associated with each vane operable in response to rotation of the rack.

20. A dish-washing machine as defined in claim 19 wherein cam surfaces are provided on said rack means for engagement with said cam means.

JAMES B. FULLERTON.

References Cited in the file of this patent

UNITED STATES PATENTS

| Number | Name | Date |
|---|---|---|
| 1,264,792 | Hayward | Apr. 30, 1918 |
| 1,345,412 | Smith | July 6, 1920 |
| 1,734,137 | Krocker | Nov. 5, 1929 |
| 1,763,992 | Smith | June 17, 1930 |
| 1,817,266 | Regero | Aug. 4, 1931 |
| 1,995,927 | Kirby | Mar. 26, 1935 |
| 2,104,456 | Friedman | Jan. 4, 1938 |
| 2,333,707 | Curtis | Nov. 9, 1943 |
| 2,372,205 | Hertz | Mar. 27, 1945 |
| 2,426,291 | Abrams | Aug. 26, 1947 |
| 2,567,820 | Messerschmidt | Sept. 11, 1951 |

FOREIGN PATENTS

| Number | Country | Date |
|---|---|---|
| 10,632/32 | Australia | Dec. 20, 1932 |
| 195,029 | Switzerland | Jan. 15, 1938 |
| 697,861 | Germany | Oct. 25, 1940 |